June 16, 1942.  L. D. MANNES ET AL  2,286,747
SOUND FILM
Filed Feb. 21, 1941
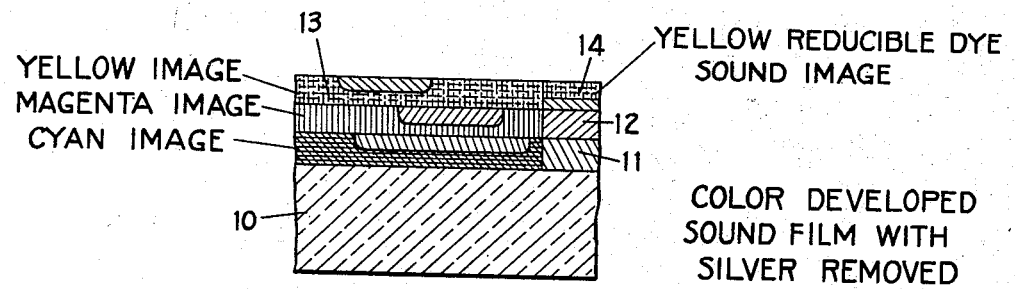
COLOR DEVELOPED SOUND FILM WITH SILVER REMOVED
SULFUR DIOXIDE AND SILVER NITRATE ↓
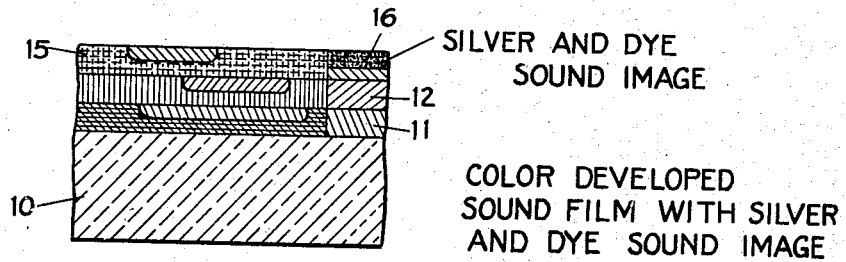
COLOR DEVELOPED SOUND FILM WITH SILVER AND DYE SOUND IMAGE
LEOPOLD D. MANNES
LEOPOLD GODOWSKY, JR.
INVENTORS
BY Newton M. Perras
R. Frank Smith
ATTORNEYS Patented June 16, 1942

2,286,747

UNITED STATES PATENT OFFICE 2,286,747

SOUND FILM

Leopold D. Mannes, New York, N. Y., and Leopold Godowsky, Jr., Westport, Conn., assignors to Eastman Kodak Company, Rochester, N. Y., a corporation of New Jersey Application February 21, 1941, Serial No. 379,932

12 Claims. (Cl. 95—2)

This invention relates to photographic color films having sound tracks thereon and particularly to a method for producing sound on such films.

In the production of motion picture films comprising two or more superimposed layers containing color images, it frequently happens that the colors most suitable for visual reproduction are not those which are most satisfactory for sound reproduction. The sound image should be dark in color, preferably black or at least predominantly minus red or minus infra-red. The sensitive cell used in reproducing the sound is usually red sensitive, and the sound track should absorb red or infra-red light. Furthermore, since the scattering of the light from its passage through one or more emulsion layers impairs its recording power and accordingly impairs the recording of high frequencies, it is important that the image in the sound track shall be in the upper layer or layers.

In multi-layer films for color photography using the subtractive process the outer layer or layer nearest the exposing light rays is usually blue sensitive and is processed to minus blue, or yellow. This color is unsuitable for the sound track image since it transmits red light and the sound image must, therefore, be made in some other color which is an efficient absorbent of red or infra-red light.

It is, accordingly, the object of the present invention to provide a method for the production of sound images in multi-layer photographic films, these images being confined principally to the upper layer or layers and composed preferably of silver or silver and a dye. Other objects will appear hereinafter.

These objects are accomplished by forming in the sound area of a multi-layer photographic film, a sound record consisting of a dye which is reducible to a leuco dye, said leuco dye being capable of reducing metal salts to form a metal image in the regions of the dye image.

In the accompanying drawing, the first stage shows a multi-layer color film having subtractive color sound and picture images therein, at least the sound image of which is composed of a dye which is reducible to a leuco compound capable of reducing metal salts to form a metal and dye sound image.

The second stage of the accompanying drawing, shows the color film after the subtractive dye sound image has been reduced to a leuco dye and the leuco dye image thus formed has been treated with silver nitrate solution to form a silver and dye sound image.

Our invention applies particularly to multilayer color and sound films of the type, well known to the art, which have a plurality of emulsion layers sensitive to different regions of the spectrum. Generally, the layers are sensitized in the natural order, that is, the blue sensitive layer is outermost, the red sensitive layer next to the support and the green sensitive layer between red and blue sensitive layers. In addition, there may be a yellow dye or silver filter layer between the blue and green sensitive layers. After original exposure in the sound and picture areas, and black-and-white negative development, the film is subjected to a series of exposure and development steps whereby silver and subtractive color images are formed in the sound and picture areas, the color development being one whereby a color-forming compound combines with the oxidation product of the developer. A film of the type mentioned and the general method of processing, have been described in Mannes, Godowsky and Wilder U. S. application Serial No. 185,700, filed January 19, 1939. In the present invention, we reduce the final dye image in the sound area to a leuco dye which is capable of reducing metal salts to metals in the regions of the leuco dye image. Coupler compounds suitable for this purpose are $\beta$-naphthoyl acetone, 1,5-dihydroxynaphthalene, aceto-acetanilide, acetoacet-2,5-dichloroanilide, acetoacet-naphthanilide etc., which react with color developers such as p-aminodiethylaniline hydrochloride to form azo methine or indophenol dyes. The mechanism of the reactions involved, as applied to the present invention is briefly as follows:

1. $\quad C + OD \rightarrow \text{reducible dye}$ wherein, coupler C combines with the oxidized developer OD forming the reducible subtractive dye image, after which the silver images are removed from the film.

2. $\quad RD + SO_2 \rightarrow \text{leuco dye}$ wherein, the reducible dye image RD is reduced with sulfur dioxide to a leuco dye image.

3. $\quad LD + AgNO_3 \xrightarrow{NH_3} Ag + AD$ wherein, the leuco dye image LD reduces silver nitrate to metallic silver in the regions of the leuco dye image, and the original dye RD is regenerated.

Therefore, in the preferred manner of our invention, we take a color film having colored sound and picture images but no metal images therein, moisten the sound area with a flanged roller, and pass this film through a chamber containing gaseous sulfur dioxide which causes the sound track dye image to bleach to the leuco form. The film is then immersed in an ammoniacal silver nitrate solution which deposits a silver image in the regions of, and in proportion to the original dye image. The silver nitrate solution is prepared by adding an aqueous ammonia solution to a 1% silver nitrate solution until the precipitate which first forms dissolves. We may use a solution of a mercury salt, such as mercuric chloride, in place of silver nitrate and thereby deposit a mercury image.

We now describe our invention with particular to the accompanying drawing.

In the first stage of the drawing is shown a fully developed color film which has a support 10 of any material such as a cellulose ester, carrying the image layer 11 bearing a cyan picture image, layer 12 bearing a magenta picture image, layer 13 bearing a yellow picture image in the picture area and a yellow reducible dye sound image 14 in the sound area.

In the second stage of the drawing is shown the color film described in the first stage of the drawing, after treatment in the sound track area with sulfur dioxide and silver nitrate, whereby, a silver and yellow dye sound image 16 is formed in the sound track area of layer 15 and the yellow picture image in the picture area remains unchanged.

While it is preferable to form picture and sound images of the same dye, in a layer such as 13 of the drawing, it is not necessary to do so. We may, instead, take a color film and print sound and picture images in a layer such as 13, then develop the picture area by reversal color development to a dye image of different composition than the dye image of the sound area, the latter dye image being of the reducible type and capable of reducing a metal salt to a metal image in the regions of the dye. This practice would, however, necessitate an extra processing step, inasmuch as the sound and picture images would be color developed separately.

The image bearing layers, such as 11 and 12 may carry color component dye images consisting of the reducible dyes of the invention or any dyes which are suitable for recording an image in color. In case it is desired to form an auxiliary image such as a key-image in one of these layers, or in the sound layer; during reversal color development we may form an azomethine dye picture image, in the manner of our invention, then by reduction with sulfur dioxide and treatment with silver nitrate form a silver image in the region of the color component image. In a similar manner a metal key-image and color-correcting image may be formed in a fourth layer by development of an azomethine dye image in the layer and, in the manner of the invention, reducing the image to the leuco form and depositing a metal image in the region of the dye image.

The film which has been processed by the methods described above may have the sound image intensified after processing by conversion into a silver sulfide image by any of the well-known sulfiding methods or, by extension of the method of the invention, the film shown in the second stage of the drawing may be again treated in the sound track area with a reducing agent and a reducible salt to form an intensified silver sound image. We may also tone the image to gold by methods known to the art.

The process which we have described may be varied in numerous ways, for example, we may apply a solution of a reducing agent to the sound track area instead of treating with a gaseous reagent. Other metal salts which may be reduced to form a metal image in the region of the dye image, may be used instead of silver nitrate, as for instance, mercuric chloride. In addition to azomethine dyes, we may form by color-forming development using phenolic couplers, indophenol type dyes which are reducible with a reagent such as sulfur dioxide.

It is to be understood that the disclosure herein is by way of example and that we consider as included in our invention all modifications and equivalents falling within the scope of the appended claims.

What we claim is:

1. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye picture and sound images in the layers, the color development process being one whereby a color-forming compound combines with the oxidation product of the developer, removing the silver images, reducing the colored sound image to a leuco compound and then treating said leuco dye image with a reducible metal salt to form a metal image in the regions of the leuco dye image.

2. The method of forming sound and natural color picture images in a multilayer film having a plurality of layers sensitive to different regions of the spectrums on a support, which comprises exposing and developing the sound and picture images, subjecting the film to a series of exposure and development steps to produce silver and dye images of a dye common to the picture and sound areas of the respective layers, the development process being one whereby a color-forming compound combines with the oxidation product of the developer, removing the silver images, reducing the colored sound image to a leuco compound and then treating said leuco dye image with a reducible metal salt to form a metal image in the regions of the leuco dye image.

3. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye images of different dyes in the picture and sound areas of a layer, the color development process being one whereby a color-forming compound combines with the oxidation product of the developer, removing the silver images, reducing the colored sound image to a leuco compound and then treating said leuco dye image with a reducible metal salt to form a metal image in the regions of the leuco dye image.

4. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye picture and sound images of azomethine dyes in the layers, the color development process being one whereby a color-forming compound combines with the oxidation product of the developer, removing the silver images, reducing the colored sound image to a leuco compound and then treating said leuco dye image with a reducible metal salt to form a metal image in the regions of the leuco dye image.

5. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye picture and sound images of azomethine dyes in the layers, the color development process being one whereby a color-forming compound combines with the oxidation product of the developer, removing the silver images, reducing the colored sound image with sulphur dioxide to a leuco compound and then treating said leuco dye image with a reducible metal salt to form a metal image in the regions of the leuco dye image.

6. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye picture and sound images of azomethine dyes in the layers, the color development process being one whereby a color-forming compound combines with the oxidation product of the developer, removing the silver images, reducing the colored sound image with sulphur dioxide to a leuco compound and then treating said leuco dye image with silver nitrate solution to form a silver image in the regions of the leuco dye image.

7. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye images of an azomethine dye in the sound area and a dye other than azomethine in the picture area of a layer, the color development process being one whereby a color-forming compound combines with the oxidation product of the developer, removing the silver images, reducing the colored sound image to a leuco compound and then treating said leuco dye image with a reducible metal salt to form a metal image in the regions of the leuco dye image.

8. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye images of an azomethine dye in the sound area and a dye other than azomethine in the picture area of the layer, the color development process being one whereby a color-forming compound combines with the oxidation product of the developer, removing the silver images, reducing the colored sound image with sulphur dioxide to a leuco compound and then treating said leuco dye image with a reducible metal salt to form a metal image in the regions of the leuco dye image.

9. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye images of an azomethine dye in the sound area and a dye other than azomethine in the picture area of a layer, the color development process being one whereby a color-forming compound combines with the oxidation product of the developer, removing the silver images, reducing the colored sound image with silver dioxide to a leuco compound and then treating said leuco dye image with a silver nitrate solution to form a silver image in the regions of the leuco dye image.

10. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye picture and sound images of indophenol dyes in the layers, the color development process being one whereby a color-forming compound combines with the oxidation product of the developer, removing the silver images, reducing the colored sound image to a leuco compound and then treating said leuco dye image with a reducible metal salt to form a metal image in the regions of the leuco dye image.

11. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye picture and sound images of indophenol dyes in the layers, the color development process being one whereby a color-forming compound combines with the oxidation product of the developer, removing the silver images, reducing the colored sound image with sulphur dioxide to a leuco compound and then treating said leuco dye image with a reducible metal salt to form a metal image in the regions of the leuco dye image.

12. The method of forming sound and natural color picture images in a multilayer film having a plurality of layers sensitive to different regions of the spectrum on a support, which comprises exposing and developing the sound and picture images, subjecting the film to a series of exposure and development steps to produce silver and dye picture and sound images of indophenol dyes in the layers, the color development process being one whereby a color-forming compound combines with the oxidation product of the developer, removing the silver images, reducing the colored sound image with sulphur dioxide to a leuco compound and then treating said leuco dye image with silver nitrate solution to form a silver image in the regions of the leuco dye image.

LEOPOLD D. MANNES.
LEOPOLD GODOWSKY, Jr.